United States Patent [19]

Gottschol et al.

[11] 4,007,036
[45] Feb. 8, 1977

[54] METHOD OF SMELTING ALUMINUM

[75] Inventors: Hans-Joachim Gottschol; Karl-Josef Gottschol, both of Hagen-Haspe, Germany

[73] Assignee: Dr. Ing. Gottschol Metallurgie Kommanditgesellschaft, Berlin, Germany

[22] Filed: Nov. 11, 1974

[21] Appl. No.: 522,757

[30] Foreign Application Priority Data

Nov. 9, 1973 Germany .......................... 2355951

[52] U.S. Cl. .................................. 75/68 R; 75/24; 75/65 R
[51] Int. Cl.² .......................................... C22B 21/00
[58] Field of Search ......... 75/24, 68 R, 63 R, 65 R; 266/33 R, 33 S; 214/18 SC

[56] References Cited

UNITED STATES PATENTS

| | | |
|---|---|---|
| 1,513,875 | 11/1924 | Wilke ................. 266/33 R |
| 2,446,637 | 8/1948 | Crampton et al. ............... 266/33 S |
| 3,037,711 | 6/1962 | Businger ................. 75/24 |
| 3,770,420 | 11/1973 | Spear et al. ............ 75/65 R X |
| 3,873,305 | 3/1975 | Claxton ................. 75/68 R |

*Primary Examiner*—M. J. Andrews
*Attorney, Agent, or Firm*—Karl F. Ross; Herbert Dubno

[57] ABSTRACT

Aluminum scrap, dross, and the like is preheated to a temperature of approximately 600° C in a prewarming drum and is then turbulenced in an input funnel leading to a satellite furnace. That turbulencing is effected by feeding the preheated aluminum pieces into a stream of molten aluminum coming from a primary smelting oven and directed tangentially into the input funnel so as to thoroughly to turbulence the particles and molten aluminum together. Dross developing in the satellite furnace is compacted and then removed and grouped up for reintroduction to the preheating step so as to extract all of the aluminum therefrom.

6 Claims, 3 Drawing Figures

4,007,036

METHOD OF SMELTING ALUMINUM

FIELD OF THE INVENTION

The present invention relates to a method of smelting a nonferrous metal. More particularly this invention relates to the smelting of aluminum and aluminum scrap.

BACKGROUND OF THE INVENTION

With the increased cost of aluminum ore it is becoming more and more necessary to recover the metal from aluminum scrap. This process is made relatively difficult due to the fact that aluminum oxide has a melting point of above 2000° C whereas aluminum metal has a melting point of approximately 660° C. This problem is particularly troublesome when it is desired to recover the aluminum from an aluminum dross comprising a large portion of aluminum.

Traditionally aluminum scrap is smelted in a rotary drum or hard smelting furnace under a salt slag. Such a method is relatively effective, however has the enormous disadvantage that the gases generated by the process are serious pollutants. In addition the salt slag itself is potentially extremely dangerous so the operation must be carried out under stringent safety precautions, thereby considerably increasing the cost of the product.

OBJECTS OF THE INVENTION

It is therefore an object of the present invention to provide an unproved method of treating nonferrous metal scrap and the like.

Another object of this invention is an improved method of processing aluminum scrap in the form of dross, metal chunks, slag, ashes and the like.

Yet another object is the provision of such a method which is relatively simple and safe.

SUMMARY OF THE INVENTION

These objects are attained according to the present invention in a system wherein the aluminum pieces constituting the starting product are preheated and then turbulenced with a molten aluminum mass. This turbulenced mixture is then heated in a satellite furnace so as to form a molten body of aluminum and a dross on the body. This dross is compacted and subsequently comminuted. The comminuted dross then is reintroduced into the process like the original metal pieces that are preheated. In many cases an extremely metal-rich aluminum dross can be fed directly to the oven.

In a method according to the present invention the continuous oxide coating on the aluminum pieces is at least partially interrupted by the turbulencing operation and the friction between the aluminum pieces and the aluminum melt in the turbulencing step. Thus even heavily oxidized pieces of aluminum scrap or aluminum dross which often contains nuggets of pure aluminum can readily be processed according to the present method. The destruction of the oxide layer is almost totally due to the turbulencing according to the present invention. The recirculating of the dross allows virtually all of the pure aluminum to be extracted with little difficulty so that an extremely efficient operation is obtained.

It should of course be noted that the method according to the present invention is applicable to other metals and can readily be used for metal in the form of chunks, shavings, chips, or the like. Thus for example it is possible to use the method according to the present invention for the smelting of magnesium.

In accordance with further features of this invention the aluminum pieces are heated to a temperature slightly below their melting point and are entrained into the turbulencing location by the molten mass of aluminum. This is affected in a jet-pump arrangement wherein the molten aluminum effectively draws the aluminum pieces along by the Bernoulli effect. The mixture so formed is injected tangentially into a filling funnel so that the two components are thoroughly turbulenced together. It is also possible according to the present invention to mix the aluminum melt and aluminum pieces directly in the satellite furnace and augment this mixing by means of high-frequency sound, induction, or simple agitation.

In accordance with yet another feature of this invention the dross is compacted by vibration or the like. In this manner it is possible to reduce the aluminum content in this dross enormously.

The system according to the present invention comprises a principal smelting furnace which is connected via at least one conduit to the satellite furnace. In addition the stack gases produced by the principal smelting furnace are employed for the preheating of the aluminum particles or other pieces. A so-called drop tube is provided between the mixing funnel and the satellite furnace so as to maximize the rubbing effect between the mixing of molten aluminum and the solid particles therein. Again an ultrasonic, inductive, or simple mechanical mixing arrangement can be provided on this drop tube.

The satellite is provided at its upper edge with an upwardly tapering conical rim that is connected to a vibrator so as to effectively compact the dross forming therein. This arrangement ensures that the molten aluminum drops whereas the light impurities therein rise into the dross. The conicity of the compaction arrangement works against the pressure of the melt.

In accordance with another feature of this invention a siphon is provided so as to prevent overflow of the aluminum dross from the satellite oven into the main smelting oven.

In accordance with another feature of this invention it is possible to provide between the main smelting furnace and the satellite a prewarming drum for material in large chunks. This material is preheated in the prewarming drum by means of gases coming from the main smelting furnace, and is there melted and agitated by the rotary movement of the prewarming drum. In this manner relatively large pieces of material can be treated which in addition to nonferrous metal components have other components which melt at a high temperature. Thus for example iron, glass, or other impurities can be removed from the nonferrous metal dross at the prewarming drum.

The system according to the present invention allows one to smelt nonferrous scraps such as dross, metal chunks, slags, ash and the like. This is carried out in an indirect smelting process which does not need the traditional salt slag. The process is almost completely nonpolluting and has an extremely high output capacity. In particular when aluminum dross is being processed it is possible with the system according to the present invention to strip therefrom a proportion of

BRIEF DESCRIPTION OF THE DRAWING

The above and other objects, features, and advantages of the invention will become more readily apparent from the following, description reference being made to the accompanying drawing in which.

SPECIFIC DESCRIPTION

Figure 1:
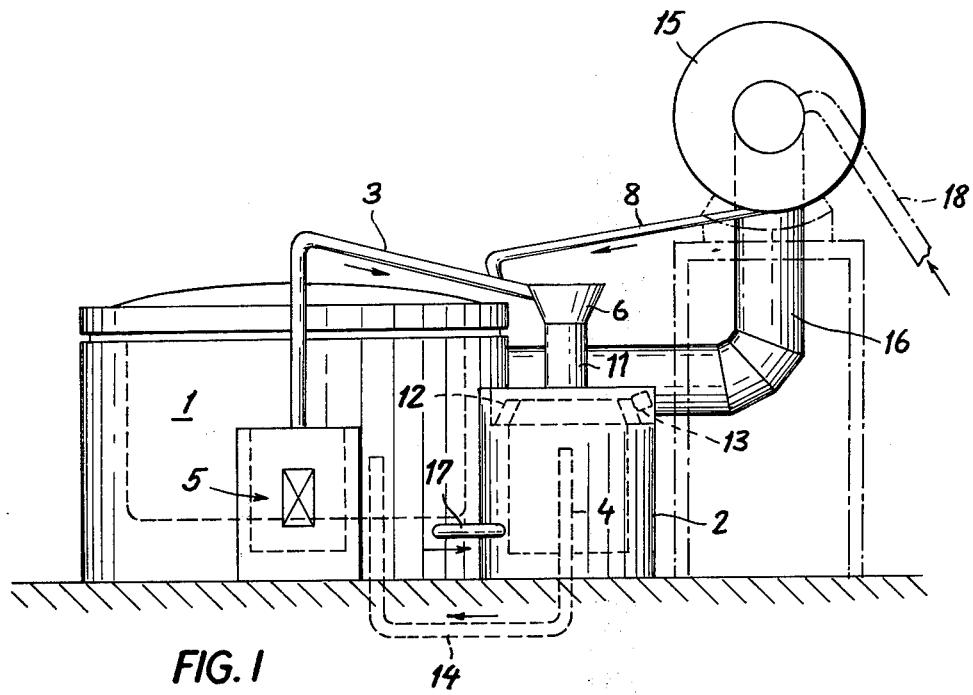
FIG. 1 is the side partly schematic view of a system according to the present invention.
Figure 2:
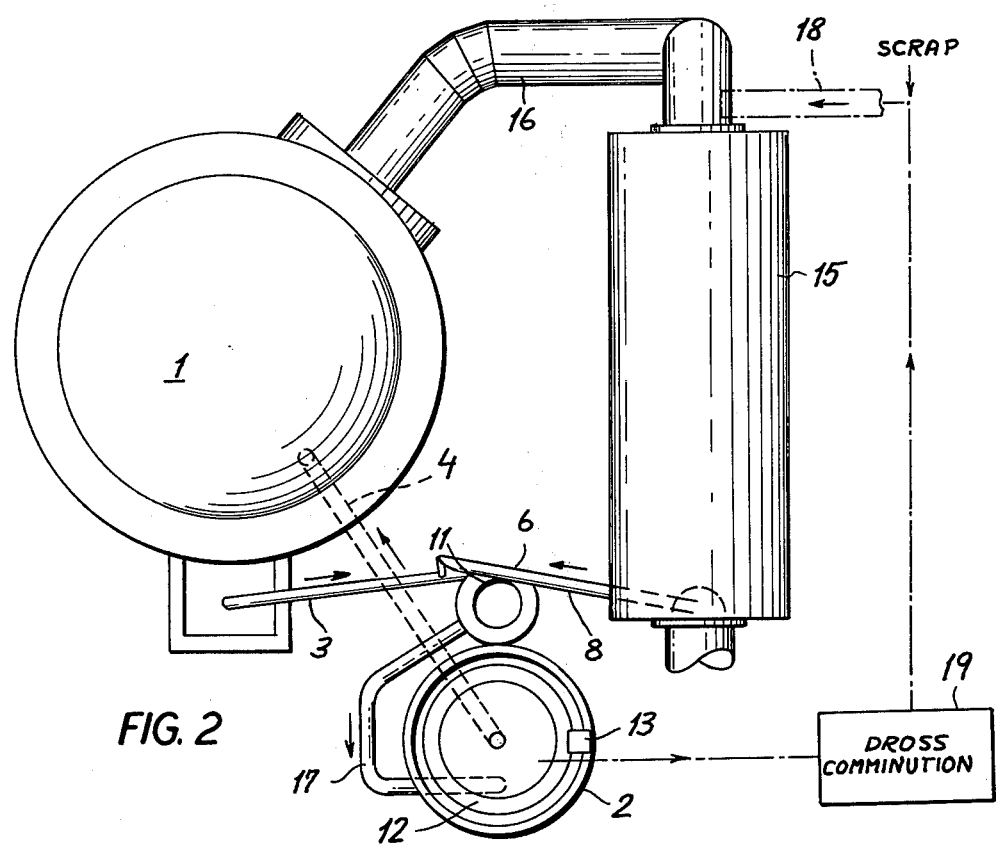
FIG. 2 is a top view of the system of FIG. 1.
Figure 3:
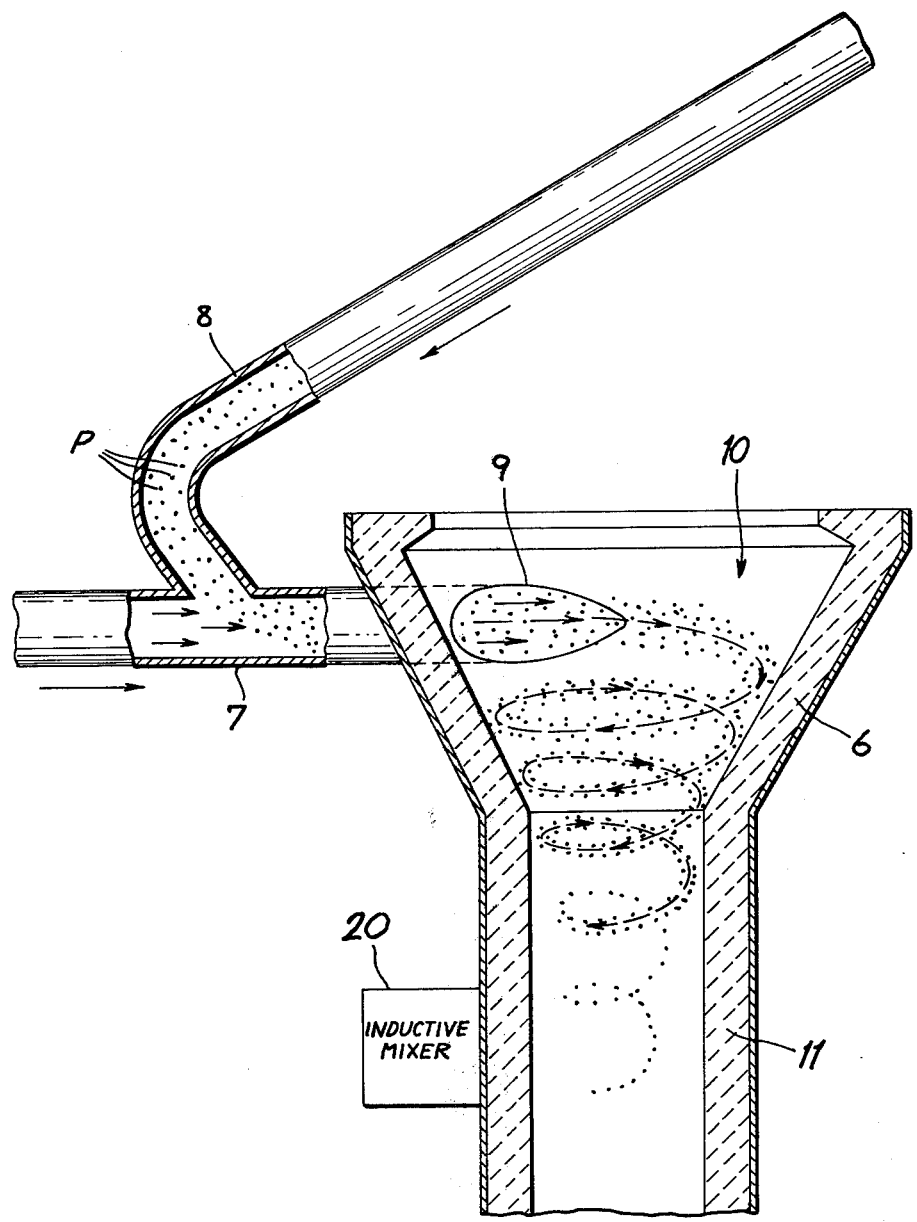
FIG. 3 is a large-scale view of a detail of FIG. 1.

FIGS. 1–3 show an apparatus for treating nonferrous metal pieces P such as scrap, dross, slag, and ashes, in particular aluminum dross. This system basically has a primary smelting furnace 1 connected to at least one satellite furnace 2 by means of conduits 3 and 4. A pump 5 is provided in conduit 3 to displace molten aluminum from the furnace 1 to the furnace 2. An input device 6 is provided for feeding aluminum pieces into the satellite furnace 2. The apparatus indirectly smelts aluminum in a process wherein molten aluminum being drawn from the furnace 1 and fed with aluminum pieces to the satellite furnace 2.

As shown in more detail in FIG. 3 the input device 6 has an upwardly open conical funnel mouth 10 into which opens a conduit 7 from the conduit 3 at a hole 9 tangential to the funnel 10. A conduit 8 from a supply of aluminum pieces P opens into the conduit 7 upstream of the funnel 10 so that these pieces P are pulled from the conduit 8 by suction in a jet-pump type of action. The opening 9 is directed tangentially into the funnel 10 which is well above the top of the satellite furnace 10 and is provided with a so called drop pipe 11 which is connected at its bottom via a conduit 17 to the furnace 2. An inductive mixer 20 is provided on the drop tube 11 to ensure good turbulencing of the mixture of the particles and the molten aluminum. It is also possible to provide an ultrasonic mixer or a simple mechanical agitator.

The satellite furnace 2 is provided at its upper edge with an upwardly tapering conical ring 12 having a vibrator 13 that ensures that the dross in this furnace 2 is compact. The conduit 4 between the satellite furnace 2 and the smelting furnace 1 is a siphon 14 which prevents overflow of aluminum dross into the furnace 1 and which keeps the furnace 1 full of molten aluminum.

Between the furnace 1 and the filling tube 6 or the feed conduit 8 there is provided a prewarming drum 15 for aluminum pieces which is heated by means of a conduit 16 collecting stack gas from the furnace 1. This arrangement serves to heat the aluminum pieces to a temperature of substantially 600° C.

The aluminum pieces P are first heated in this prewarming drum 15 and then mixed with the molten aluminum in the input funnel 6 and the fall tube 11. The dross forming on top of the melt in the furnace 2 is compacted by the ring 12 and the vibrator 13 and is then removed and comminuted by a grinder 19 and fed back into the drum 15. Thus the process recirculates the dross so as to extract all of the aluminum therefrom.

We claim:

1. A method of smelting pieces of a nonferrous metal, said method comprising the steps of:
   a. drawing preheated pieces of said nonferrous metal by suction into a stream of said nonferrous metal,
   b. turbulencing the resulting mixture;
   c. introducing the turbulenced mixture into a satellite furnace, and
   d. heating said mixture in said satellite furnace to form a molten body of said nonferrous metal and a layer of dross on said body.

2. The method defined in claim 1, further comprising the steps of:
   e. compacting said dross and separating same from said body,
   f. comminuting the compacted and separated dross, and
   g. employing the comminuted dross as at least some of said pieces of step (a).

3. The method defined in claim 2 wherein said dross is compacted in step (e) by vibration.

4. The method defined in claim 2, further comprising the steps of:
   h. siphoning said molten body at least partially from said satellite furnace into a main smelting furnace,
   i. maintaining said metal molten in said main furnace,
   k. drawing hot gas from said main furnace and using said hot gas to heat said pieces in step (a), and
   l. drawing molten metal from said main furnace and using said molten metal as said molten mass in step (b).

5. The method defined in claim 2 wherein said pieces and said mass are turbulenced by introduction of said pieces into a stream of said molten mass and thereafter projecting said stream carrying said pieces tangentially into a mixing chamber.

6. A process for the melting of aluminum which comprises:
   preheating aluminum pieces;
   drawing the preheated aluminum pieces by suction into a stream of aluminum fed to a satellite furnace, thereby combining the preheated aluminum pieces and the aluminum stream;
   mixing the aluminum of said stream and said pieces intimately by introducing the stream carrying said aluminum pieces tangentially at high velocity into a conical vortex chamber ahead of said satellite furnace and passing the resulting mixture from said chamber into said satellite furnace;
   feeding aluminum melt from said satellite furnace into a main smelting furnace;
   removing aluminum dross from said satellite furnace, compacting said dross and comminuting the compacted dross to form at least part of the aluminum pieces combined with said stream of aluminum from the comminuted compacted dross; and
   feeding molten aluminum from said main furnace to said satellite furnace as said stream.

* * * * *